United States Patent
Ebihara et al.

(10) Patent No.: US 10,317,834 B2
(45) Date of Patent: Jun. 11, 2019

(54) IMAGE FORMING APPARATUS

(71) Applicant: CANON KABUSHIKI KAISHA, Tokyo (JP)

(72) Inventors: Shun-ichi Ebihara, Suntou-gun (JP); Tomonori Shida, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/905,130

(22) Filed: Feb. 26, 2018

(65) Prior Publication Data

US 2018/0246455 A1    Aug. 30, 2018

(30) Foreign Application Priority Data

Feb. 28, 2017 (JP) .................................. 2017-037529

(51) Int. Cl.
*G03G 15/00* (2006.01)
*G06F 3/12* (2006.01)

(52) U.S. Cl.
CPC ....... *G03G 15/553* (2013.01); *G03G 15/5079* (2013.01); *G06F 3/1203* (2013.01); *G06F 3/1229* (2013.01); *G06F 3/1294* (2013.01); *G03G 2221/1663* (2013.01)

(58) Field of Classification Search
CPC .................................................. G03G 15/553
See application file for complete search history.

(56) References Cited

U.S. PATENT DOCUMENTS

| | | | | |
|---|---|---|---|---|
| 5,877,692 A | * | 3/1999 | Watanabe | G03G 15/553 340/457.4 |
| 2003/0091352 A1 | * | 5/2003 | Carling | G03G 15/553 399/24 |
| 2006/0067717 A1 | * | 3/2006 | Yokogawa | G03G 15/55 399/26 |
| 2011/0069988 A1 | * | 3/2011 | Kurita | G03G 15/0225 399/100 |
| 2011/0229157 A1 | * | 9/2011 | Kawai | G03G 15/556 399/27 |
| 2011/0255883 A1 | * | 10/2011 | Fukuda | G03G 15/0896 399/24 |

FOREIGN PATENT DOCUMENTS

| | | |
|---|---|---|
| JP | 2002-318508 A | 10/2002 |
| JP | 2006-91510 A | 4/2006 |
| JP | 2007-17754 A | 1/2007 |
| JP | 2009-47948 A | 3/2009 |
| JP | 2014-21173 A | 2/2014 |

* cited by examiner

*Primary Examiner* — Clayton E. LaBalle
*Assistant Examiner* — Jas A Sanghera
(74) *Attorney, Agent, or Firm* — Canon USA Inc., IP Division

(57) ABSTRACT

Provided is an image forming apparatus including a process unit that is used for an image forming operation for forming an image on a sheet and detachable from a main body of the image forming apparatus, a storage unit that stores operation history information indicating an operation history of the process unit, a detection unit that detects that the process unit is replaced with a new process unit, and a determination unit that determines a replacement timing of the new process unit on a basis of the operation history information of the process unit.

10 Claims, 7 Drawing Sheets

FIG. 3

| MONTHLY TOTAL | | 1 APRIL | 2 MAY | 3 JUNE | 4 JULY | 5 AUGUST | 6 SEPTEMBER | 7 OCTOBER | 8 NOVEMBER | 9 DECEMBER | 10 JANUARY | 11 FEBRUARY | 12 MARCH | 13 APRIL | 14 MAY | 15 JUNE | 16 JULY | 17 AUGUST | 18 SEPTEMBER |
|---|---|---|---|---|---|---|---|---|---|---|---|---|---|---|---|---|---|---|---|
| NUMBER OF PRINTED SHEETS FOR EACH TYPE (1000 PAGES) | THIN PAPER | 3.62 | 3.03 | 2.78 | 10.28 | 10.62 | 10.18 | 9.32 | 9.02 | 9.55 | 9.12 | 9.29 | 9.75 | 10.88 | 9.14 | 11.10 | 10.62 | 10.87 | 9.08 |
| | PLAIN PAPER | 11.89 | 8.99 | 10.39 | 3.51 | 2.88 | 2.81 | 3.05 | 3.28 | 2.81 | 3.19 | 3.14 | 2.76 | 3.22 | 3.14 | 3.69 | 3.36 | 2.88 | 1.81 |
| | THICK PAPER | 0.01 | 0.00 | 0.04 | 0.03 | 0.01 | 0.02 | 0.03 | 0.03 | 0.01 | 0.02 | 0.04 | 0.01 | 0.03 | 0.00 | 0.01 | 0.02 | 0.00 | 0.04 |
| | GLOSSY PAPER | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| | OTHERS | 0.00 | 0.01 | 0.02 | 0.00 | 0.00 | 0.01 | 0.00 | 0.01 | 0.01 | 0.01 | 0.02 | 0.01 | 0.01 | 0.00 | 0.01 | 0.01 | 0.02 | 0.00 |
| CUMULATIVE NUMBER OF PRINTED SHEETS (1000 PAGES) | | 16 | 28 | 41 | 55 | 68 | 81 | 94 | 106 | 118 | 131 | 143 | 156 | 170 | 182 | 197 | 211 | 225 | 236 |
| CUMULATIVE ABRASION AMOUNT (μm) | | 1.42 | 2.52 | 3.73 | 4.89 | 6.01 | 7.10 | 8.14 | 9.17 | 10.21 | 11.24 | 12.29 | 13.33 | 14.51 | 15.54 | 16.78 | 17.95 | 19.10 | 20.00 |

FIG. 7

| OPERATION HISTORY INFORMATION | | HIGHEST TEMPERATURE °C | HIGHEST HUMIDITY % | LOWEST TEMPERATURE °C | LOWEST HUMIDITY % |
|---|---|---|---|---|---|
| T1 | IMAGE FORMING APPARATUS A | 23 | 59 | 21 | 57 |
| T2 | IMAGE FORMING APPARATUS B | 25 | 49 | 24 | 36 |
| T3 | IMAGE FORMING APPARATUS C | 25 | 52 | 22 | 28 |
| T4 | IMAGE FORMING APPARATUS D | 24 | 41 | 24 | 37 |
| T5 | IMAGE FORMING APPARATUS E | 24 | 30 | 23 | 28 |
| T6 | IMAGE FORMING APPARATUS F | 26 | 45 | 23 | 25 |

IMAGE FORMING APPARATUS

BACKGROUND OF THE INVENTION

Field of the Invention

The present invention relates to an image forming apparatus such as a copier, a printer, or a facsimile.

Description of the Related Art

In an image forming apparatus using an electrophotographic method, a consumable part such as a toner supplying container including toner or a part which has a lifetime shorter than a lifetime of a main body of the image forming apparatus is replaced with a new part, when the part reaches an end of its lifetime. By replacing such a part, it is possible to continuously use the image forming apparatus over a long period. Recently, there are growing needs for reducing operating cost of the image forming apparatus and needs for easing a complicated administrative task such as replacement of a consumable part or a replaceable component (hereinafter, collectively referred to as a replaceable unit or a process unit) of the image forming apparatus. Under such circumstances, markets for a service of consulting for cost reduction and a service to undertake an administrative task have also expanded.

Providing such a service requires an administrator (hereinafter, referred to as a management user) who performs the service to accurately determine a consumption degree of the consumable part, a deterioration degree of the replaceable component, or the like of the image forming apparatus. Appropriate estimation of a replacement timing of such consumable part or replaceable component results in reduction of a burden on the management user and also improvement of a service for a user (hereinafter, referred to as a print user) of the image forming apparatus.

For example, a deterioration degree of a replaceable component may be estimated by the number of passing sheets or the number of rotations of a rotating component in the replaceable component including the rotating component, among replaceable components. In this case, when the number of passing sheets or the number of rotations of the rotating component exceeds a predetermined value, a message indicating that the replacement timing of the replaceable unit has come or the replacement timing is approaching is displayed on the image forming apparatus or a PC connected to the image forming apparatus. Japanese Patent Laid-Open No. 2007-17754 discloses a configuration in which a timing when such a message is displayed is not fixed but corrected at appropriate time in accordance with a use state of a print user. Additionally, Japanese Patent Laid-Open No. 2014-21173 discloses a configuration in which a temperature and humidity environment of an image forming apparatus is acquired via a network and a timing when a message is displayed is corrected at appropriate time in accordance with the temperature and humidity environment.

By correcting at the appropriate time a timing of displaying a message or notifying a user of a message, the message is able to be displayed or sent at a timing close to an actual replacement timing of a replaceable unit. That is, accuracy of the timing of notifying a user of the message is improved. However, it is difficult to accurately estimate the replacement timing of a new replaceable unit immediately after a replaceable unit is replaced with the new replaceable unit.

SUMMARY OF THE INVENTION

Provided is an image forming apparatus capable of accurately determining a replacement timing of a new replaceable unit immediately after a replaceable unit is replaced with the new replaceable unit.

According to an aspect of the invention, an image forming apparatus includes a process unit that is used for an image forming operation for forming an image on a sheet and detachable from a main body of the image forming apparatus, a storage unit that stores operation history information indicating an operation history of the process unit, a detection unit that detects that the process unit is replaced with a new process unit, and a determination unit that determines a replacement timing of the new process unit on a basis of the operation history information of the process unit.

Further features of the present invention will become apparent from the following description of exemplary embodiments with reference to the attached drawings.

BRIEF DESCRIPTION OF THE DRAWINGS

FIG. 3 is a table indicating operation history information according to an embodiment.

FIG. 7 is a table illustrating operation history information according to an embodiment.

DESCRIPTION OF THE EMBODIMENTS

Figure 1:
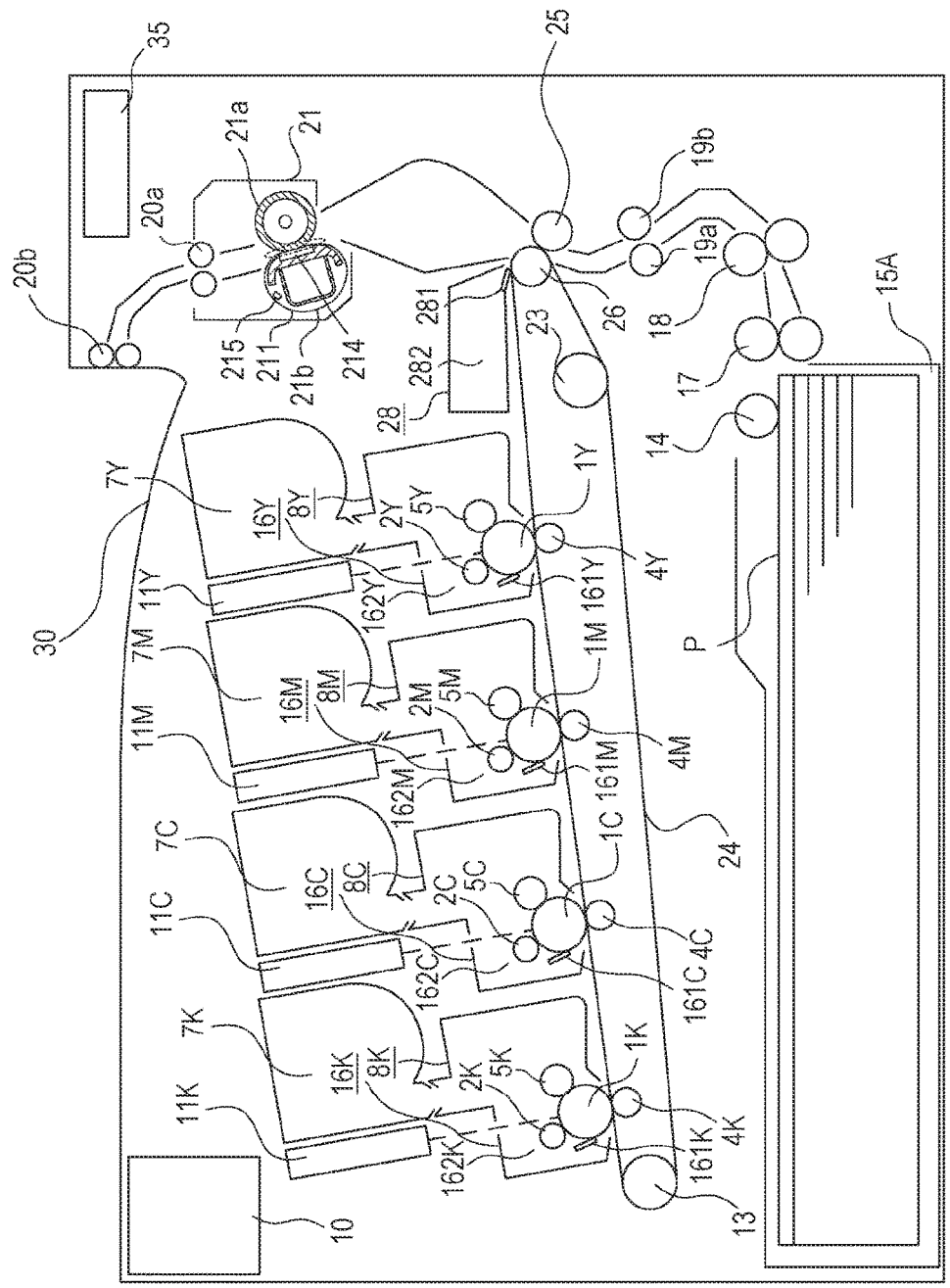
FIG. 1 is a diagram illustrating a configuration of an image forming apparatus according to an embodiment.

Hereinafter, exemplary embodiments of the invention will be described with reference to drawings. Note that, the following embodiments are examples and the invention is not limited to content of the embodiments. In each of the following drawings, a constituent which is not necessary for the description of the embodiments is omitted from the drawing.

First Embodiment

FIG. 1 is a diagram illustrating a schematic configuration of an image forming apparatus according to the present embodiment. Letters Y, M, C, and K at ends of reference signs in FIG. 1 indicate colors of yellow, magenta, cyan, and black respectively, toner images of which are formed by corresponding members. Note that, in the following description, in a case where it is not necessary to distinguish colors of the toner, reference signs are used excluding the letters at the ends of the reference signs. A charging roller 2 is an image carrying member at a time of image formation and causes a surface of a photosensitive member 1 that is rotationally driven to be charged at a uniform potential. An exposure portion 11 exposes the charged photosensitive member 1 to form an electrostatic latent image on the photosensitive member 1. A developing portion 8 has a development roller 5 and performs development of the electrostatic latent image by causing toner in the developing portion 8 to adhere to the electrostatic latent image on the photosensitive member 1 by a development bias output by the development roller 5. Thereby, the electrostatic latent image on the photosensitive member 1 is visualized as a toner image. Note that, the toner of the developing portion 8 is supplied from a toner supplying container 7. A primary transfer roller 4 outputs a primary transfer bias to transfer the toner image of the photosensitive member 1 to an intermediate transfer belt 24. A cleaning portion 16 has a blade 161 and a toner collecting container 162, and the blade 161 collects, in the toner collecting container 162, toner that is not transferred to the intermediate transfer belt 24 and remains on the photosensitive member 1. Note that, the intermediate transfer belt 24 is stretched around a driving roller 26, a tension roller 13, and an auxiliary roller 23, and is rotationally driven following rotation of the driving roller 26. Then, toner images on photosensitive members 1Y, 1M, 1C, and 1K are superimposed and transferred to the intermediate transfer belt 24, and thus a full-color toner image is able to be formed.

A sheet P in a sheet feeding cassette 15A is transported to a nip area between a secondary transfer roller 25 and the driving roller 26 by a pickup roller 14, feeding rollers 17 and 18, and a transport roller pair 19a and 19b. Then, the secondary transfer roller 25 outputs a secondary transfer bias to transfer the toner image on the intermediate transfer belt 24 to the sheet P. A belt cleaner 28 includes a blade 281 and a cleaner container 282, and the blade 281 collects, into the cleaner container 282, toner that is not transferred to the sheet P and remains on the intermediate transfer belt 24. Subsequently, the sheet P to which the toner image is transferred is transported to a fixing unit 21.

The fixing unit 21 includes a heating roller 21b and a pressing roller 21a and fixes the toner onto the sheet P by heating and pressing the sheet P. The heating roller 21b has a heating film 211 having a cylindrical shape and heat resistance. The heating film 211 is obtained by sequentially forming an elastic layer having thermal conductivity and a release layer made from a PFA material on an outer periphery of a metal base film. The heating film 211 is configured to be gently fitted to an outer periphery of a supporting holder that holds a plate-shaped heat generating element 214, held between the pressing roller 21a and the plate-shaped heat generating element 214, and rotate following rotation of the pressing roller 21a. A temperature detection portion 215 abuts against an inner surface of the heating film 211 and measures temperature of the fixing unit 21. The sheet P onto which the toner image is fixed is discharged to a sheet discharge tray 30 by discharging rollers 20a and 20b.

Note that, in the present embodiment, the photosensitive member 1, the charging roller 2, the developing portion 8, and the cleaning portion 16 are integrated to form a process cartridge which is detachable from a main body of the image forming apparatus, that is, form a replaceable unit (process unit) which is able to be replaced. Similarly, the intermediate transfer belt 24, the driving roller 26, the tension roller 13, the auxiliary roller 23, and the primary transfer roller 4 are integrated to form a belt unit and serve as a replaceable unit (process unit) which is able to be replaced. Further, the fixing unit 21 is also a replaceable unit (process unit) which is able to be replaced.

A controller 10 controls the entire image forming apparatus. For example, the controller 10 is connected to a control panel 35 or a host computer (PC) (not illustrated), and performs image formation in accordance with a print command including information, for example, such as the number of sheets to be printed or a type of a sheet, which is input by a print user. The controller 10 also notifies a user of a replacement timing of the replaceable unit via the control panel 35 or the host computer. Further, the controller 10 includes a storage unit, such as a memory, that stores various data.

Figure 2:
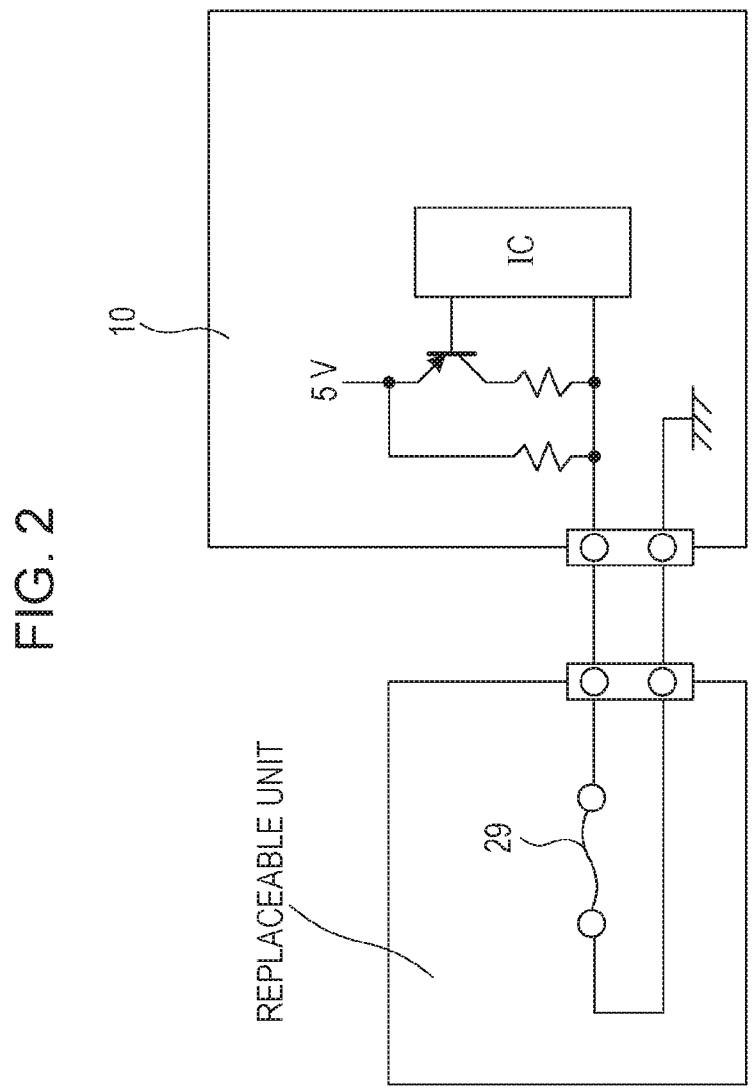
FIG. 2 is a diagram illustrating a configuration for detecting that replacement with a new replaceable unit is performed according to an embodiment.

Note that, a fuse 29 as illustrated in FIG. 2 is attached to the replaceable unit. The controller 10 is able to detect whether or not the fuse 29 is blown out by an IC mounted in the controller 10. Further, the controller 10 is able to cut off the fuse 29 by causing a current larger than a rated current of the fuse 29 to flow through the fuse 29. The controller 10 detects whether or not the fuse 29 is blown out, when power is supplied, when a door (not illustrated) used for replacing the replaceable unit is closed, or when initialization processing such as sleep recovery is executed. When the fuse 29 is not blown out, the controller 10 determines that a new replaceable unit is newly attached. In this case, a series of initialization processing is continued after causing the current larger than the rated current to flow through the fuse 29 to blow out the fuse 29.

Hereinafter, the present embodiment will be described by taking the fixing unit 21 as an example. When the release layer of the heating film 211 included in the fixing unit 21 wears out, a minute crack is generated in the release layer and image quality deteriorates. Thus, a maximum allowable value of an abrasion amount, which does not affect image quality, is experimentally obtained in advance and saved in the controller 10. In the description below, an upper limit of the abrasion amount is set as 20 μm. The controller 10 determines the abrasion amount of the release layer of the heating film 211 in accordance with a type of a sheet used in printing. Therefore, an abrasion amount per page is experimentally obtained for each type of sheet and saved in the controller 10. In the description below, when "plain paper" is used, the abrasion amount per page is set as $0.95 \times 10^{-4}$ μm, and when "thin paper" is used, the abrasion amount per page is set as $0.8 \times 10^{-4}$ μm.

The controller 10 determines the type of sheet used in printing from a print command and determines a cumulative abrasion amount of the release layer of the heating film 211, which is obtained from the abrasion amount for each type of the sheet. Then, the number of printed sheets for each type of sheet and the cumulative abrasion amount in a predetermined period, for example, per month are stored as operation history information of the fixing unit 21. In this manner, the controller 10 functions as a history recording unit that records the operation history information in the storage unit. FIG. 3 illustrates an example of the operation history information of the fixing unit 21. FIG. 3 illustrates a state where a new fixing unit 21 was mounted in the image forming apparatus and the fixing unit 21 has been used for 18 months. According to FIG. 3, after the fixing unit 21 was replaced, the rate of using the plain paper in printing is high in first three months, whereas the rate of using the thin paper in printing is high in the following 15 months. When the cumulative number of printed sheets reaches about 236000 sheets, the cumulative abrasion amount reaches 20 μm, and a message indicating that a replacement timing of the fixing unit 21 has come is notified. When the fixing unit 21 is replaced upon the message, on the basis of operation history information of the fixing unit 21 before the replacement, the controller 10 determines the replacement timing of the fixing unit 21 after the replacement.

Figure 4:
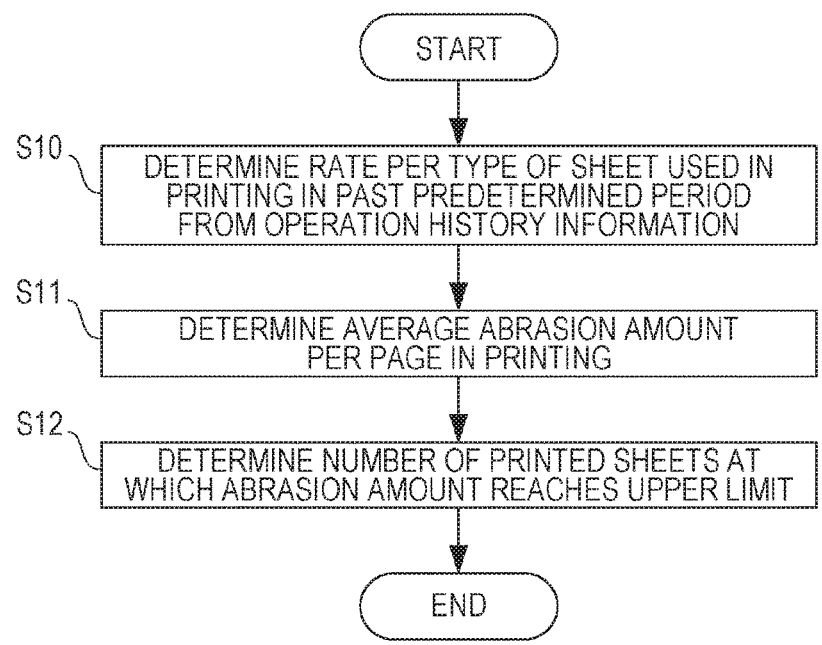
FIG. 4 is a flowchart of replacement timing determination processing when a replaceable unit is replaced according to an embodiment.

FIG. 4 is a flowchart of processing for determining, when the fixing unit 21 is replaced, a replacement timing of the fixing unit 21 after the replacement. At S10, the controller 10 determines a rate per type of the sheet used in printing in a past predetermined period, on the basis of operation history information of the fixing unit 21 before the replacement. For example, the past predetermined period is set to three months. In this case, the controller 10 determines that a rate of using the thin paper is 0.8 and a rate of using the plain paper is 0.2 from the operation history information of FIG. 3. At S11, the controller 10 determines an average abrasion amount A per page in printing. In the present example, since the rate of using the thin paper is 0.8 and the rate of using the plain paper is 0.2, the average abrasion amount A per page in printing is obtained by the following formula (1).

$$A=(0.95\times10^{-4})\times0.2+(0.80\times10^{-4})\times0.8=0.83\times10^{-4} \quad (1)$$

At S12, on the basis of the average abrasion amount A, the controller 10 obtains, by the following formula (2), the number of printed sheets L at which the cumulative abrasion amount of the release layer of the heating film 211 reaches 20 μm as an upper limit.

$$L=20/A\approx24000 \quad (2)$$

For example, the controller 10 notifies a user of the number of printed sheets L at which the abrasion amount of the fixing unit 21 reaches the upper limit by displaying the number of printed sheets L on the control panel 35 or transmitting the number of printed sheets L to the host computer as the replacement timing. Such a configuration allows the user or a service person who has replaced the fixing unit 21 to know a next replacement timing of the fixing unit 21 and to perform planned stock management of a replaceable component and devise an efficient plan for maintenance.

Note that, instead of or in addition to using the type of sheet, information indicating properties of a sheet, such as a basis weight of the sheet, surface roughness of the sheet, or stiffness of the sheet, may be used to determine the abrasion amount of the heating film 211. A lifetime of the fixing unit 21 might not be determined by the abrasion amount of the release layer but determined by, for example, deterioration of hardness of the pressing roller 21a. Specifically, for example, the replacement timing of the fixing unit 21 is able to be determined by estimating a deterioration degree of hardness of the pressing roller 21a from a temperature history detected by the temperature detection unit 215 of the fixing unit 21 before replacement.

Note that, the replacement timing is able to be determined similarly also for other replaceable units by holding, as the operation history information, a parameter applicable to estimate the replacement timing thereof. For example, in a case where the determination is applied to the belt unit, any one of a temperature and humidity environment where the image forming apparatus operates, a primary transfer bias of the primary transfer roller 4, and a secondary transfer bias of the secondary transfer roller 25 or any combination thereof is able to be recorded as the operation history information. A deterioration degree of the intermediate transfer belt 24, the primary transfer roller 4, or the secondary transfer roller 25, each of which is a rotating component, may be estimated on the basis of the operation history information to determine the replacement timing. Instead of the primary transfer bias of the primary transfer roller 4 or the secondary transfer bias of the secondary transfer roller 25, a value of an electric current that flows following an output of each of the biases may be used. The replacement timing of the process cartridge is determined by estimating a deterioration degree of the development roller 5 on the basis of a temperature and humidity environment where the image forming apparatus operates or a development bias of the development roller 5.

In the present embodiment, the replacement timing is notified with the number of printed sheets. However, for example, the controller 10 may obtain the average number of printed sheets Pm per month and divide the cumulative number of printed sheets L at which the replacement timing is reached by the average number of printed sheets Pm, and thereby notify the replacement timing as "L/Pm month later".

The replacement timing might not be determined on the basis of the cumulative number of printed sheets L but determined on the basis of the number of rotations of a rotating member. Further, in the present embodiment, the operation history information in a predetermined period of the replaceable unit before replacement, specifically, the operation history information in the latest 3-month period is used to determine the replacement timing of the replaceable unit after replacement, but any period may be set by the user. Alternatively, an algorithm may be used in which an appropriate period is set after a tendency is grasped from the entire operation history information. In the present embodiment, replacement with a new replaceable unit is detected by the fuse 29, but another method may be used in which a memory tag is attached to a replaceable unit and communication is performed between the replaceable unit and the image forming apparatus main body to thereby determine whether or not the replaceable unit is new.

Second Embodiment

In the first embodiment, when a replaceable unit is replaced with a new replaceable unit, replacement timing of the new replaceable unit after the replacement is estimated on the basis of operation history information of the replaceable unit before the replacement. In the present embodiment, when an image forming apparatus is installed, a lifetime of a replaceable unit of the image forming apparatus is estimated on the basis of operation history information of another image forming apparatus. Although a configuration of the image forming apparatus is basically similar to that of FIG. 1, a temperature/humidity sensor is provided in the image forming apparatus and temperature and humidity are able to be detected in the present embodiment. Hereinafter, the present embodiment will be described by taking a case where a lifetime of a belt unit is estimated as an example.

Figure 5:
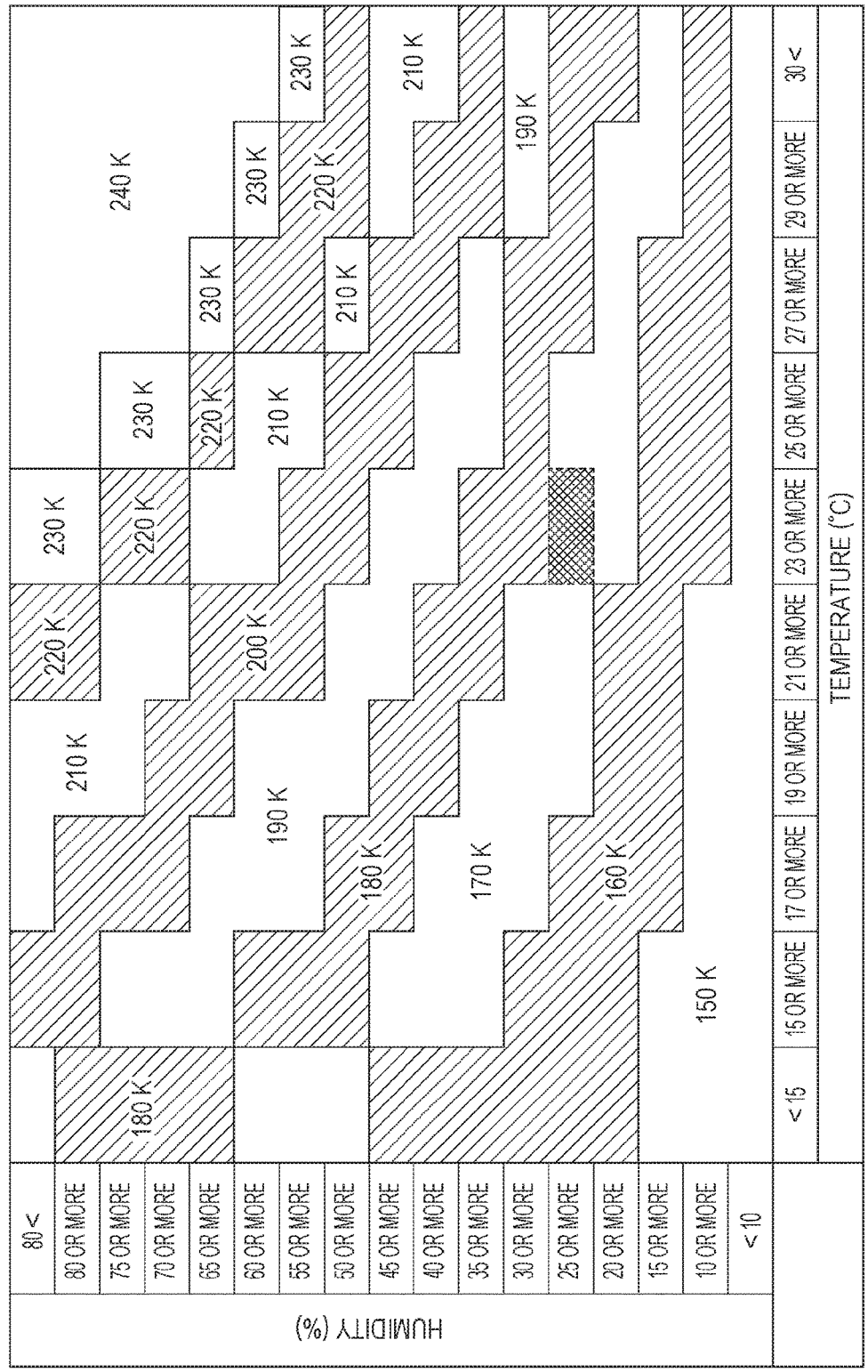
FIG. 5 is a diagram describing determination of replacement timing according to an embodiment.

Under an environment with lower temperature and lower humidity, a resistance value of each of the intermediate transfer belt 24 and the primary transfer roller 4 which are included in the belt unit becomes higher, and under an environment with higher temperature and higher humidity, such resistance value becomes lower. When an image forming operation is repeated, due to electrification accompanying application of a primary transfer bias, the intermediate transfer belt 24 and the primary transfer belt 4 are deteriorated and the resistance value gradually increases. When the resistance value exceeds an allowance value, a current which is needed for transferring a toner image does not flow, and thus image failure such as transfer failure occurs. Accordingly, in the present embodiment, as illustrated in FIG. 5, a relation between a combination of temperature and humidity and the total number of printed sheets that indicates a replacement timing of the belt unit is experimentally obtained in advance and saved in the controller 10. For example, the relation described in FIG. 5 indicates that, under an environment where the temperature is 16° and the humidity is 25%, the replacement timing of the belt unit after replacement is when the total number of printed sheets reaches 160000 sheets.

Figure 6:
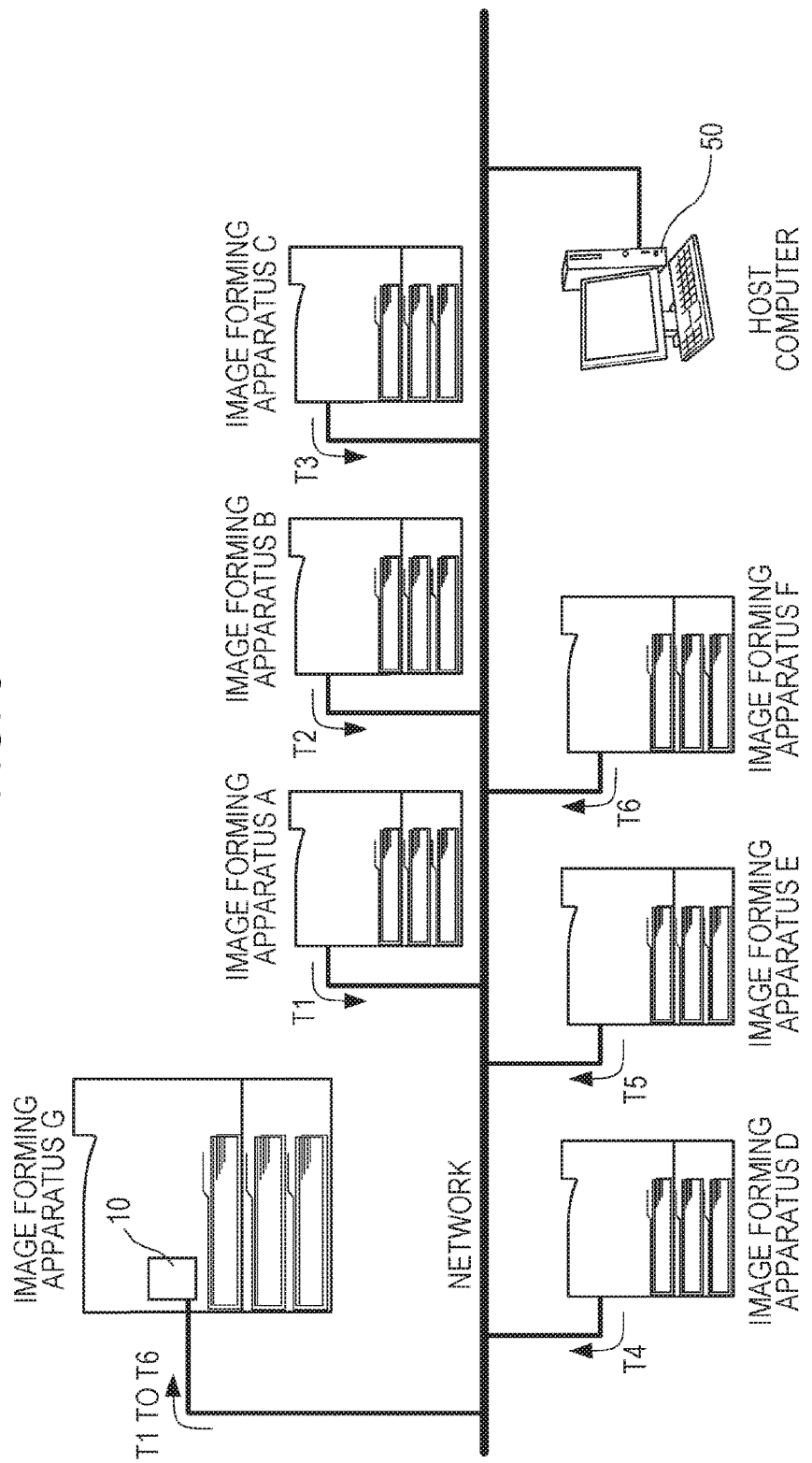
FIG. 6 is a diagram illustrating an entire configuration of an embodiment.

FIG. 6 is a diagram illustrating a configuration of the present embodiment and illustrates a state in which an image forming apparatus G is newly installed while a plurality of image forming apparatuses A to F and a host computer 50 are connected via a network and the image forming apparatuses A to F have already been operated. As illustrated in FIG. 7, the image forming apparatuses A to F respectively hold operation history information T1 to T6. In the present embodiment, the operation history information is the highest values and the lowest values of the temperature and the humidity which are detected by a temperature/humidity sensor of each of the image forming apparatuses in one month. As illustrated in FIG. 6, the controller 10 of the image forming apparatus G acquires at the time of installation the operation history information T1 to T6 from the image forming apparatuses A to F via the network.

When acquiring the operation history information T1 to T6, the controller 10 of the image forming apparatus G determines the lowest values of the temperature and the humidity. In FIG. 7, the lowest value of the temperature is 21° indicated by the operation history information T1 and the lowest value of the humidity is 25% indicated by the operation history information 16.

As illustrated in FIG. 5, when the temperature is 21° and the humidity is 25%, the total number of printed sheets is 170000 sheets. Accordingly, for example, the controller 10 of the image forming apparatus G displays on the control panel 35 that the replacement timing of the belt unit is when 170000 sheets are printed or notifies the host computer 50 to cause the host computer 50 to display such a replacement timing. The replacement timing is determined by using the lowest values of the temperature and the humidity which are indicated by the operation history information T1 to T6 so that the earliest replacement timing is to be determined. However, the replacement timing may be obtained by using average values or the highest values of the temperature and the humidity, which are indicated by the operation history information T1 to T6.

Then, the image forming apparatus G counts the actual number of printed sheets and appropriately notifies a user of the number of remaining printed sheets until the replacement timing of the belt unit comes. For example, in a case where printing has been performed on 32000 sheets, the user is notified that the replacement timing of the belt unit comes after printing is performed on 138000 sheets.

Further, the controller 10 of the image forming apparatus G operates and records, as operation history information, the lowest values of the temperature and the humidity which are detected by the temperature/humidity sensor and updates the number of remaining printed sheets until the replacement of the belt unit in accordance with the lowest values. For example, it is assumed that at the time when printing has been performed on 320000 sheets, the lowest values of the temperature and the humidity which are detected by the temperature/humidity sensor of the image forming apparatus G are respectively 20° and 23%. In this case, according to FIG. 5, the total number of printed sheets until the replacement of the belt unit comes becomes 160000 sheets, which is less than an estimation value of 1270000 sheets at the time of installation. Accordingly, in this case, at the time when printing has been performed on 320000 sheets, the controller 10 of the image forming apparatus G notifies the user that the number of remaining printed sheets until the replacement of the belt unit comes is 128000 sheets.

As above, in the present embodiment, at the time when an image forming apparatus is newly installed, that is, at the time when the image forming apparatus has no operation history information of a replaceable unit, a replacement timing of the replaceable unit is able to be accurately determined. Thus, since a next replacement timing is able to be grasped as soon as a user or a service person installs the image forming apparatus, or at a time immediately after the installation, it is possible to perform planned stock management of a replaceable component and devise an efficient plan for maintenance. Further, in a case where there is a change in precondition when the replacement timing is estimated, an updated replacement timing is also able to be notified to a print user or a management user in accordance with the change.

Note that, in the present embodiment, at the time of installation of the image forming apparatus, replacement timing of a replaceable unit is determined on the basis of operation history information of another image forming apparatus and then the replacement timing is corrected on the basis of operation history information of the image forming apparatus. After the replaceable unit is replaced, the replacement timing of the replaceable unit after the replacement is able to be determined on the basis of operation history information of the replaceable unit of the image forming apparatus before the replacement, similarly to the first embodiment. Further, also as to the replacement timing of the replaceable unit after the replacement, the replacement timing which is determined at the time of the replacement is able to be corrected on the basis of the operation history information of the replaceable unit. The image forming apparatuses A to F may be configured to transmit the operation history information T1 to T6 to the host computer 50 of FIG. 6 where the operation history information T1 to T6 is saved. In this case, the image forming apparatus G is able to acquire the operation history information T1 to T6 from the host computer 50 at the time of the installation. A concept of the present embodiment is able to be applied also to other replaceable units than the belt unit. At this time, a parameter and a determination criterion that are suitable for the replaceable unit of a determination target may be used for determination of a replacement timing.

OTHER EMBODIMENTS

The invention is able to be realized by processing in which a program that realizes one or more functions of the embodiments described above is supplied to a system or an apparatus via a network or a storage medium and one or more processors of a computer of the system or the apparatus read out and execute the program. An aspect of the invention is also able to be realized by using a circuit (for example, ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-037529 filed Feb. 28, 2017, which is hereby incorporated by reference herein in its entirety.

What is claimed is:
1. An image forming apparatus comprising:
   a process unit that is used for an image forming operation for forming an image on a sheet and detachable from a main body of the image forming apparatus;
   a storage unit that stores operation history information indicating an operation history of the process unit;
   a detection unit that detects that the process unit is replaced with a new process unit; and a determination unit that determines a replacement timing of the new process unit on a basis of the operation history information of the process unit in a case where the detection unit detects the replacement,
wherein the storage unit further stores operation history information indicating an operation history of the new process unit, and the determination unit further corrects the replacement timing of the new process unit on a basis of the operation history information of the new process unit.

2. The image forming apparatus according to claim 1, further comprising
a notification unit that notifies a user of the replacement timing of the new process unit determined by the determination unit at a time when the process unit is replaced with the new process unit.

3. The image forming apparatus according to claim 1, wherein
the determination unit determines the replacement timing of the new process unit on a basis of the operation history information of the process unit in a predetermined period before the process unit is replaced with the new process unit.

4. The image forming apparatus according to claim 1, further comprising:
a communication unit that communicates with a different image forming apparatus or a computer via a network, wherein
the determination unit acquires, from the different image forming apparatus or the computer, operation history information of a process unit of the different image forming apparatus at a time of installation of the image forming apparatus, and determines a replacement timing of the process unit of the image forming apparatus on a basis of the operation history information of the process unit of the different image forming apparatus.

5. The image forming apparatus according to claim 4, wherein
at the time of installation of the image forming apparatus, in a case of acquiring pieces of operation history information of process units of a plurality of different image forming apparatuses, the determination unit determines a replacement timing of the process unit of the image forming apparatus by using operation history information having an earliest replacement timing of the process unit of the image forming apparatus among the pieces of operation history information acquired.

6. The image forming apparatus according to claim 1, wherein the operation history information includes any of temperature information and humidity information which are measured by the image forming apparatus.

7. The image forming apparatus according to claim 1, wherein the operation history information includes information indicating a number of sheets on which image formation is performed, a type of a sheet, or properties of the sheet.

8. The image forming apparatus according to claim 1, wherein
the process unit includes a rotating member and
the operation history information includes information indicating a number of rotations of the rotating member.

9. The image forming apparatus according to claim 1, wherein the process unit includes a member that outputs a bias and
the operation history information includes information indicating a value of the bias or a value of an electric current that flows following an output of the bias.

10. The image forming apparatus according to claim 1, wherein the replacement timing is indicated by a number of sheets on which image formation is performed.

* * * * *